United States Patent [19]
Brown et al.

[11] Patent Number: 5,885,201
[45] Date of Patent: Mar. 23, 1999

[54] NON-SELF LOADING CONTROLLED DEFLECTION ROLL

[75] Inventors: Dale A. Brown, Milton, Wis.; Arnold J. Roerig, Gold Canyon, Ariz.

[73] Assignee: Beloit Technologies, Inc., Wilmington, Del.

[21] Appl. No.: 899,927

[22] Filed: Jul. 24, 1997

[51] Int. Cl.$^6$ .................................................. B21B 13/22
[52] U.S. Cl. ................................................ 492/7; 492/20
[58] Field of Search ........................... 492/7, 20, 5, 16, 492/6

[56] References Cited

U.S. PATENT DOCUMENTS

| | | |
|---|---|---|
| 3,802,044 | 4/1974 | Spillman et al. . |
| 3,885,283 | 5/1975 | Biondetti . |
| 4,821,384 | 4/1989 | Arav . |
| 4,829,842 | 5/1989 | Schiel ........................................ 74/421 |
| 4,837,907 | 6/1989 | Roerig et al. . |
| 4,891,874 | 1/1990 | Roerig et al. . |
| 5,010,633 | 4/1991 | Brown et al. . |
| 5,060,357 | 10/1991 | Roerig et al. . |
| 5,193,258 | 3/1993 | Brown ......................................... 492/7 |
| 5,242,361 | 9/1993 | Brown et al. ............................... 492/7 |
| 5,290,223 | 3/1994 | Lehmann .................................... 492/7 |
| 5,329,849 | 7/1994 | Roerig ........................................ 492/7 |
| 5,419,242 | 5/1995 | Van Haag ................................... 492/7 |
| 5,495,798 | 3/1996 | Nikanen et al. ............................ 492/7 |

FOREIGN PATENT DOCUMENTS

| | | | |
|---|---|---|---|
| 0454951A1 | 2/1991 | European Pat. Off. ........ | D21G 1/00 |
| 86 08 228.0 | 8/1989 | Germany ......................... | D21G 1/02 |
| WO96 05368A2 | 2/1996 | WIPO . | |

*Primary Examiner*—Irene Cuda
*Attorney, Agent, or Firm*—Michael Best & Friedrich LLP

[57] ABSTRACT

A non-self loading controlled deflection roll for a papermaking machine having a machine direction and a cross-machine direction, the roll including a shaft support member, first and second shell support members, a roll shaft having a longitudinal axis in the cross-machine direction, the shaft having axially spaced first and second ends, a roll shell surrounding the shaft, the shell having axially spaced first and second ends, the shell being rotatable about the shaft, a bearing pad supporting the shell relative to the shaft, the bearing pad being located between the first and second ends of the shell, first and second outboard bearings supporting the shaft relative to the shaft support member adjacent the first and second ends, respectively, first and second spherical bushings supporting the shell relative to the shaft, the first and second spherical bushings being mounted on the shaft axially inwardly of the first and second outboard bearings, respectively, each of the spherical bushings having a first annular bushing member supporting the respective first and second shell support members and a second annular bushing member mounted on the shaft, the first and second annular bushing members having complementary spherical engagement surfaces, and first and second outboard shoe assemblies.

21 Claims, 3 Drawing Sheets

NON-SELF LOADING CONTROLLED DEFLECTION ROLL

BACKGROUND OF THE INVENTION

This invention relates to a controlled deflection roll such as is used in the press and calender sections of a papermaking machine. More particularly, this invention relates to a non-self loading controlled deflection roll.

A typical controlled deflection roll includes a roll shaft having a longitudinal axis extending in a cross-machine direction. A roll shell surrounds the shaft. The shell engages another roll to apply a nip pressure. Due to the length of the controlled deflection roll in the cross-machine direction, the shell experiences some sag, or downward deflection, as a result of the weight of the shell and the applied nip load. The controlled deflection roll can be either self-loading or non-self loading. In a self-loading controlled deflection roll, the shell is translationally movable relative to the shaft by a hydraulic bearing pad so the nip will close when the bearing pad piston is pressurized. In a non-self loading controlled deflection roll, the shaft and the shell are radially fixed at their respective ends, and the entire controlled deflection roll is moved to close the nip. Typically, the non-self loading controlled deflection roll uses spherical roller bearings to support the ends of the shell relative to the shaft. The spherical roller bearings accommodate the relative deflection of the shaft and the shell.

SUMMARY OF THE INVENTION

One of the problems with the prior art non-self loading controlled deflection roll is that the spherical roller bearings require a relatively large amount of space in the end portion of the controlled deflection roll. The spherical roller bearings are also difficult to protect and lubricate for high temperature operations. In addition, the spherical roller bearings are not well suited to light loads and high speeds. Further, because the spherical roller bearings are self-aligning, seals used with these bearings must accommodate runout due to center shaft displacement caused by deflection of the shaft.

The present invention provides an improved non-self loading controlled deflection roll which overcomes the limitations of earlier non-self loading controlled deflection rolls. The non-self loading controlled deflection roll of the present invention includes a spherical bushing to mount the gearbox to the roll shaft and uses the gearbox bearings, which are high speed tapered roller bearings, to support the roll shell and carry the roll shell bending reaction forces. The roll shaft is free to deflect, and the spherical bushings accommodate misalignment between the roll shaft and the rotating roll shell. Thus, no other roller bearings are required and the conventional spherical roller bearings of the prior art are eliminated.

More particularly, the invention provides a non-self loading controlled deflection roll for a papermaking machine. The roll comprises a shaft support member, a roll shaft having a longitudinal axis in the cross-machine direction, and a roll shell surrounding the shaft. A bearing pad is supported on the shaft to supportingly engage the shell relative to the shaft, the bearing pad being located between the opposite ends of the shell. Outboard bearings, preferably spherical bearings, support the shaft relative to the shaft support member adjacent the opposite ends of the shaft. Spherical bushings support the shell relative to the shaft axially inwardly of the outboard bearings. Each of the spherical bushings has a first annular bushing member supporting the shell and a second annular bushing member mounted on the shaft. The first and second annular bushing members have complementary spherical engagement surfaces. In the preferred embodiment, the first annular bushing members are constructed of bronze, and the second annular bushing members are constructed of steel.

Additionally, the invention provides a non-self loading controlled deflection roll comprising a shaft support member, a roll shaft, a roll shell, a bearing pad, first and second outboard bearing members supporting the shaft relative to the shaft support member, first and second inboard bearing members supporting the shell relative to the shaft, and first and second outboard shoe assemblies supported on the shaft. The first shoe assembly is axially located between the first inboard bearing member and the bearing pad and substantially axially outward of the first end of the shell. The second shoe assembly is located between the second inboard bearing member and the bearing pad and substantially axially outward of the second end of the shell. The outboard bearing members, the inboard bearing members and the outboard shoe assemblies interact to allow independent deflection of the shaft and the shell.

Preferably, the roll further comprises first and second shell support members and first and second seal assemblies sealingly engaging the respective shell support member and the shaft. The first seal assembly is located axially between the first inboard bearing member and the first outboard shoe assembly, and the second seal assembly is located axially between the second inboard bearing member and the second outboard shoe assembly. The seal assemblies seal a first fluid providing a liquid temperature barrier from a second fluid lubricating the shell and the bearing pad. Preferably, the seal assemblies are radially extending barrier seals forming a liquid barrier and a heat shield between the first and second fluids. Also, the roll preferably comprises first and second shell bearings supporting the shell relative to the shell support member and a drive mechanism to rotatably drive the shell.

One advantage of the present invention is that the elimination of the spherical roller bearings provides space in which high temperature barrier seals may be used. Another advantage of the present invention is that the use of spherical bushings to accommodate the deflection of the shaft provides a better sealing surface for the barrier seals. Additionally, the elimination of the spherical roller bearings allows outboard loading shoe assemblies to be used to adjust the nip forces applied near the ends of the shell. Further, the non-self loading controlled deflection roll of the present invention provides for a great amount of commonality and interchangeability of parts with a similar self-loading controlled deflection roll.

Other features and advantages of the invention will become apparent to those skilled in the art upon review of the following detail description, claims and drawings.

Figure 1:
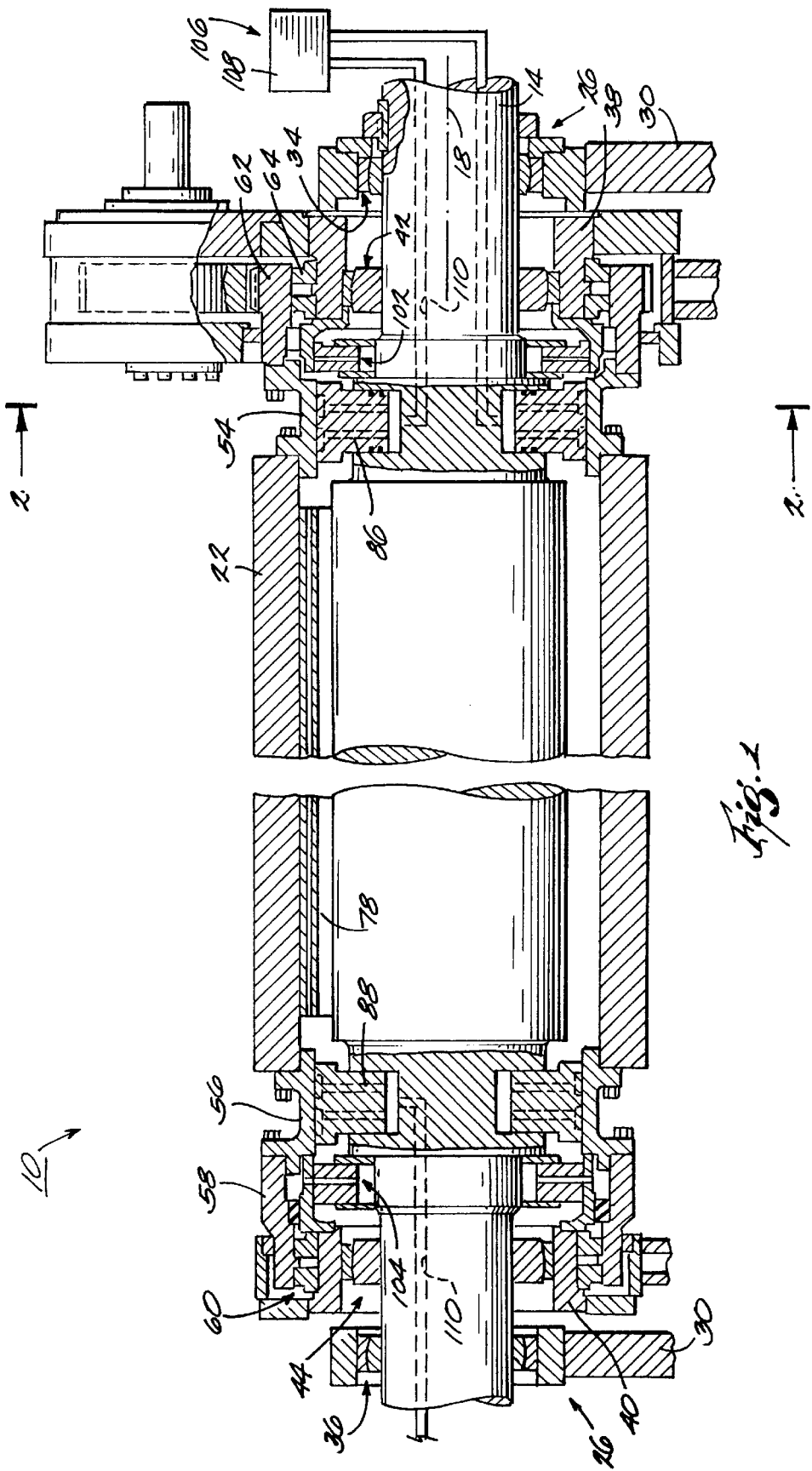
FIG. 1 is a partial side elevational and cross-sectional view of a non-self loading controlled deflection roll embodying the invention.

Before one embodiment of the invention is explained in detail, it is to be understood that the invention is not limited in its application to the details of the construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting.

DESCRIPTION OF THE PREFERRED EMBODIMENT

A non-self loading controlled deflection roll 10 embodying the invention is partially illustrated in FIG. 1. The controlled deflection roll 10 is part of a papermaking machine (not otherwise shown) having a machine direction (into and out of the paper in FIG. 1) and a cross-machine direction (right to left in FIG. 1). The controlled deflection roll 10 includes a center stationary support shaft 14 having a longitudinal axis 18 extending in the cross-machine direction. The controlled deflection roll 10 also includes a hollow cylindrical roll shell 22 surrounding the roll shaft 14. In a manner known in the art, the controlled deflection roll 10 is movable into contact or nipping engagement with another roll (not shown) to apply a nip load by applying an external load to the ends of the roll shaft 14. Due to the length of the controlled deflection roll 10 in the cross-machine direction, the roll shell 22 experiences some sag, or downward deflection, as a result of the weight of the roll shell 22 and any nip loading applied. This deflection is controlled in the manner described below in more detail.

The controlled deflection roll 10 also includes a support 26 including a stand or shaft support member 30 mounted on a work floor (not shown). The support 26 also includes first and second or right and left outboard bearing members 34 and 36, respectively. The bearing members 34 and 36 are supported by the shaft support member 30 and are preferably spherical bearings. The outboard bearing members 34 and 36 support the respective axial ends of the roll shaft 14. Each of the bearing members 34 and 36 includes a radially outer portion mounted on the shaft support member 30 and a radially inner portion mounted on the roll shaft 14.

The support 26 also includes first and second or right and left annular shell support members 38 and 40 mounted on the shaft 14 by respective first and second or right and left inboard bearing members 42 and 44. The shell support members 38 and 40 support the roll shell 22 relative to the roll shaft 14, as explained below. The shell support members 38 and 40 surround portions of the respective axial ends of the roll shaft 14. In the illustrated construction, the right shell support member 38 is a gearbox, and the left shell support member 40 is a bearing box. In other constructions, however, each shell support member 38 and 40 can be a bearing box.

Figure 3:
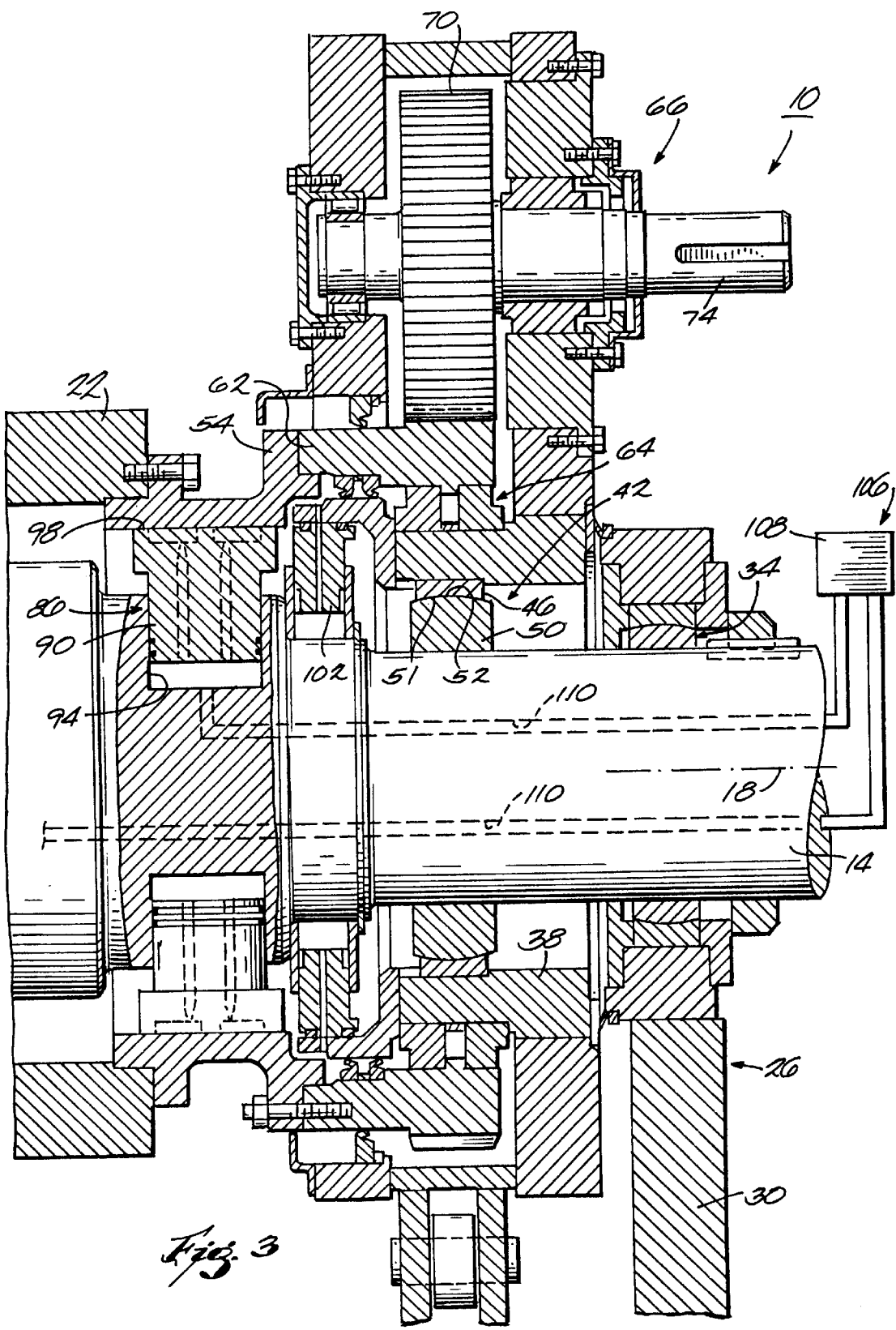
FIG. 3 is an enlarged side elevational and cross-sectional view of a portion of the non-self loading controlled deflection roll shown in FIG. 1.

The inboard bearing members 42 and 44 are preferably spherical bushings. The spherical bushings 42 and 44 are located axially inwardly of the respective outboard bearing members 34 and 36. The spherical bushings 42 and 44 extend between the respective shell support members 38 and 40 and the roll shaft 14. As shown in FIGS. 1 and 3, each of the spherical bushings 42 and 44 includes a first annular bushing member 46 supporting the corresponding shell support member 38 or 40, and a second annular bushing member 50 mounted on the roll shaft 14. The annular bushing members 46 and 50 have respective complementary spherical engagement surfaces 51 and 52 (see FIG. 3). In the preferred embodiment, the annular bushing member 50 is constructed of a material which is harder than the material of which the annular bushing member 46 is constructed. Preferably, the annular bushing member 46 is constructed of bronze, and the annular bushing member 50 is constructed of steel.

The spherical bushings 42 and 44 accommodate deflection of the roll shaft 14 so that the shell support members 38 and 40 maintain a consistent orientation with respect to the shell 22, as more fully explained below. The outboard bearing members 34 and 36 and the spherical bushings 42 and 44 interact to allow the roll shaft 14 and the roll shell 22 to each deflect independently of the other while allowing the support members 38 and 40 to maintain their alignment with the shell 22 and while allowing the shaft support member 30 to remain fixed to and perpendicular to the work floor.

As shown in FIG. 1, first and second or right and left head flanges 54 and 56 are respectively bolted or otherwise fixed to the right and left ends of the roll shell 22. The left head flange 56 is bolted or otherwise fixed to a bearing ring 58 that is part of a bearing assembly 60 for the left end of the roll shell 22. The right head flange 54 is bolted or otherwise fixed to a gear 62 which rotates on a bearing 64. The bearing 64 is preferably a tapered roller bearing.

The controlled deflection roll 10 also includes (see FIG. 3) a drive assembly 66. It should be understood, however, that in other embodiments of the invention the roll shell 22 may be non-driven. The drive assembly 66 includes a drive gear 70 meshing with the gear 62. The drive gear 70 is driven by a shaft 74 connected to a prime mover (not shown).

The controlled deflection roll 10 also includes (see FIG. 1) a bearing pad 78 supported on the roll shaft 14 to supportingly engage the roll shell 22 relative to the roll shaft 14. The bearing pad 78 is located between the axial ends of the roll shell 22. While in the illustrated construction the roll 10 includes a single bearing pad 78 extending substantially the length of the roll shell 22, in alternative constructions, the controlled deflection roll 10 could include a plurality of individual bearing pads supporting the roll shell 22. Hydraulic fluid or lubricant is provided between the engagement surface of the bearing pad 78 and the inner surface of the roll shell 22. Such a bearing pad arrangement is known in the art.

The controlled deflection roll 10 also includes first and second or right and left outboard shoe assemblies 86 and 88. The outboard shoe assemblies 86 and 88 are mounted on the roll shaft 14 and engage the inner surfaces of the head flanges 54 and 56, respectively, so as to further control the deflection of the roll shell 22. The outboard shoe assembly 86 is located substantially axially outward of the right end of the roll shell 22 and between the spherical bushing 42 and the bearing pad 78. The outboard shoe assembly 88 is located substantially axially outward of the left end of the roll shell 22 and between the spherical bushing 44 and the bearing pad 78.

Figure 2:
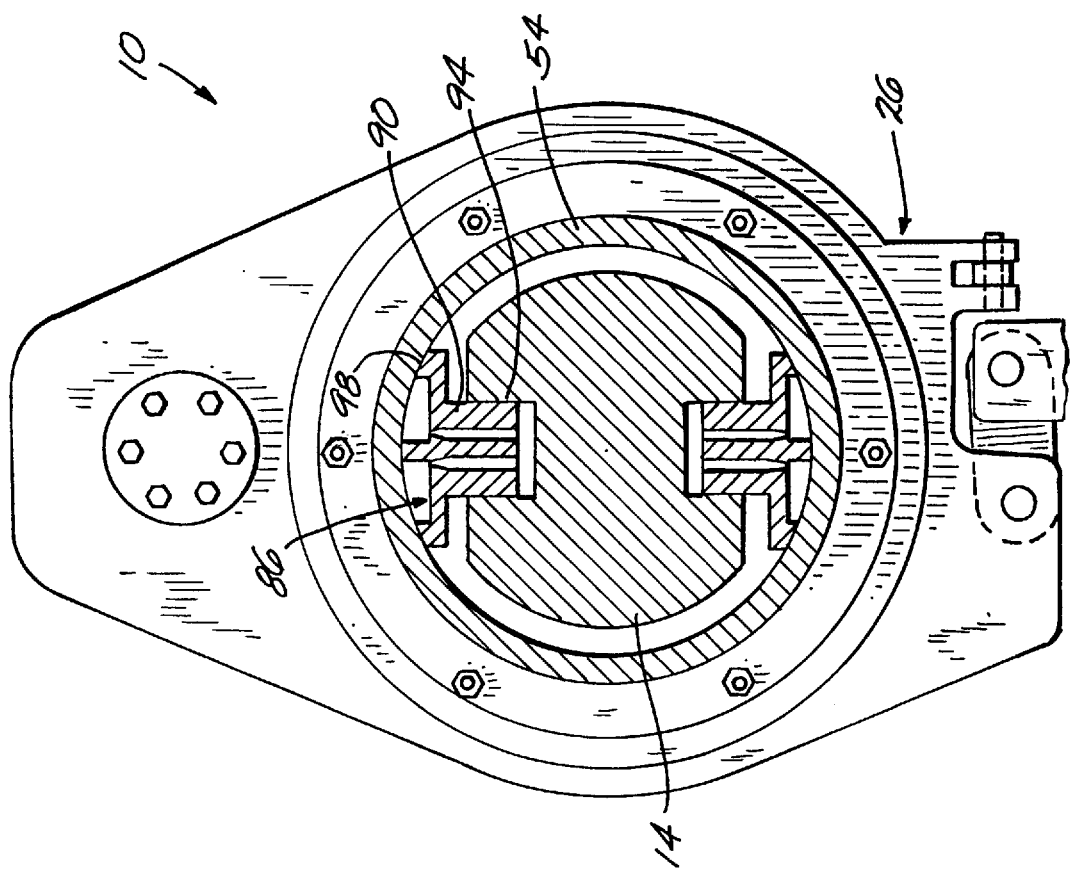
FIG. 2 is a cross-sectional view taken along line 2—2 in FIG. 1.

Each of the outboard shoe assemblies 86 and 88 includes (see FIGS. 2 and 3) a piston 90 which engages a bore or cylinder 94 defined in the surface of the roll shaft 14. Each of the outboard shoe assemblies 86 and 88 also includes a bearing shoe surface 98 engaging the inner surface of the respective head flange 54 or 56.

The controlled deflection roll 10 also includes (see FIGS. 1 and 3) first and second or right and left seal assemblies 102 and 104 sealingly engaging the respective shell support members 38 and 40 and the roll shaft 14. Preferably, the seal assemblies 102 and 104 are radially extending barrier seals extending between the inner surface of the respective shell support members 38 and 40 and the outer surface of the roll shaft 14. The seal assembly 102 is located between the spherical bushing 42 and the outboard shoe assembly 86. The seal assembly 104 is located between the spherical bushing 44 and the outboard shoe assembly 88. In the preferred embodiment, a first fluid or lubricant is used as a liquid temperature barrier, and a second fluid or lubricant is used to lubricate the inner surface of the roll shell 22 and the bearing pad 78.

The seal assemblies 102 and 104 seal the first fluid from the second fluid. The seal assemblies 102 and 104 form a liquid barrier and a heat shield between the first and second fluids.

The controlled deflection roll 10 also includes (see FIGS. 1–3) a hydraulic system 106 (partially shown). The hydraulic system 106 includes a pump 108 supplying hydraulic fluid to various systems in the controlled deflection roll 10 through conduits 110. In the preferred embodiment, the hydraulic system 106 provides hydraulic fluid to actuate the bearing pad 78 and to actuate the outboard shoe assemblies 86 and 88.

Various features of the invention are set forth in the following claims.

We claim:

1. A non-self loading controlled deflection roll for a papermaking machine having a machine direction and a cross-machine direction, said roll comprising a shaft support member, first and second shell support members having respective inner surfaces, a roll shaft having an outer surface and a longitudinal axis in the cross-machine direction, said shaft having axially spaced first and second ends, a roll shell surrounding said shaft, said shell having axially spaced first and second ends, said shell being rotatable about said shaft, a bearing pad supporting said shell relative to said shaft, said bearing pad being located between said first and second ends of said shell, first and second outboard bearings supporting said shaft relative to said shaft support member adjacent said first and second ends of said shaft, respectively, first and second spherical bushings respectively supporting said first and second shell support members, relative to said shaft, said first and second spherical bushings being mounted on said shaft axially inwardly of said first and second outboard bearings, respectively, said first spherical bushing having a first annular bushing member supporting said first shell support member and a second annular bushing member mounted on said shaft, said second spherical bushing having a first annular bushing member supporting said second shell support member and a second annular bushing member mounted on said shaft, said first and second annular bushing members having complementary spherical engagement surfaces, first and second head flanges respectively mounted on said first and second ends of said shell, first and second outboard shoe assemblies respectively supported on said shaft and engaging said first and second head flanges, said first shoe assembly being axially located between said first spherical bushing and said bearing pad, said first shoe assembly being located substantially axially outward of said first end of said shell, said second shoe assembly being located between said second spherical bushing and said bearing pad, said second shoe assembly being located substantially axially outward of said second end of said shell, a first fluid providing a temperature barrier, a second fluid lubricating said shell and said bearing pad, and a first seal assembly sealingly engaging inner surface of said first shell support member and said outer surface of said shaft and a second seal assembly sealingly engaging inner surface of said second shell support member and said outer surface of said shaft, said first seal assembly being axially located between said first spherical bushing and said bearing pad, said second seal assembly being axially located between said second spherical bushing and said bearing pad, and said seal assemblies sealing said first fluid from said second fluid.

2. A non-self loading controlled deflection roll for a papermaking machine having a machine direction and a cross-machine direction, said roll comprising a shaft support member, a roll shaft having a longitudinal axis in the cross-machine direction, said shaft having axially spaced first and second ends, a roll shell surrounding said shaft, said shell having axially spaced first and second ends, said shell being rotatable about said shaft, a bearing pad supporting said shell relative to said shaft, said bearing pad being located between said first and second ends of said shell, first and second outboard bearings supporting said shaft relative to said shaft support member adjacent said first and second ends of said shaft, respectively, and first and second spherical bushings supporting said shell relative to said shaft, said first and second spherical bushings being mounted on said shaft axially inwardly of said first and second outboard bearings, respectively, each of said spherical bushings having a first annular bushing member supporting said shell and a second annular bushing member mounted on said shaft, said first and second annular bushing members having complementary spherical engagement surfaces.

3. A roll as set forth in claim 2 wherein said first annular bushing members are constructed of a first material, wherein said second annular bushing members are constructed of a second material, and wherein said second material is harder than said first material.

4. A roll as set forth in claim 3 wherein said first annular bushing members are constructed of bronze, and wherein said second annular bushing members are constructed of steel.

5. A roll as set forth in claim 2 and further comprising first and second outboard shoe assemblies supported on said shaft, said first shoe assembly being axially located between said first spherical bushing and said bearing pad, said first shoe assembly being located substantially axially outward of said first end of said shell, said second shoe assembly being located between said second spherical bushing and said bearing pad, said second shoe assembly being located substantially axially outward of said second end of said shell.

6. A roll as set forth in claim 5 and further comprising first and second head flanges respectively mounted on said first and second ends of said shell, wherein said first outboard shoe assembly engages said first head flange, and wherein said second shoe assembly engages said second head flange.

7. A roll as set forth in claim 2 and further comprising first and second shell support members respectively supporting said first and second ends of said shell, wherein said first annular bushing member of said first spherical bushing supports said first shell support member, and wherein said first annular bushing member of said second spherical bushing supports said second shell support member.

8. A roll as set forth in claim 7 wherein said first and second shell support members have respective inner surfaces, wherein said shaft has an outer surface, and wherein said roll further comprises a first seal assembly sealingly engaging said inner surface of said first shell support member and said outer surface of said shaft and a second seal assembly sealingly engaging said inner surface of said second shell support member and said outer surface of said shaft, said first seal assembly being axially located between said first spherical bushing and said bearing pad, said second seal assembly being axially located between said second spherical bushing and said bearing pad.

9. A roll as set forth in claim 8 and further comprising a first fluid and a second fluid lubricating said shell and said bearing pad, wherein said first and second seal assemblies seal said first fluid from said second fluid.

10. A roll as set forth in claim 9 wherein said inner surfaces of said first and second shell support members are annular, wherein said outer surface of said shaft is cylindrical, and wherein said seal assemblies are radially extending barrier seals forming a liquid barrier and a heat shield between said first and second fluids.

11. A roll as set forth in claim 7 and further comprising first and second shell bearings supporting said shell relative to said first and second shell support members, respectively, and a drive mechanism to rotatably drive said shell.

12. A non-self loading controlled deflection roll for a papermaking machine having a machine direction and a cross-machine direction, said roll comprising a shaft support member, a roll shaft having a longitudinal axis in the cross-machine direction, said shaft having axially spaced first and second ends, a roll shell surrounding said shaft, said shell having axially spaced first and second ends, said shell being rotatable about said shaft, a bearing pad supporting said shell relative to said shaft, said bearing pad being located between said first and second ends of said shell, first and second outboard bearing members supporting said shaft relative to said shaft support member adjacent said first and second ends of said shaft, respectively, first and second inboard bearing members supporting said shell relative to said shaft, said first and second inboard bearing members being mounted on said shaft axially inwardly of said first and second outboard bearing members, respectively, and first and second outboard shoe assemblies supported on said shaft, said first outboard shoe assembly being axially located between said first inboard bearing member and said bearing pad, said first shoe assembly being located substantially axially outward of said first end of said shell, said second shoe assembly being located between said second inboard bearing member and said bearing pad, said second shoe assembly being located substantially axially outward of said second end of said shell.

13. A roll as set forth in claim 12 and further comprising first and second head flanges respectively mounted on said first and second ends of said shell, wherein said first outboard shoe assembly engages said first head flange, and wherein said second outboard shoe assembly engages said second head flange.

14. A roll as set forth in claim 12 wherein said first and second inboard bearing members are spherical bushings.

15. A roll as set forth in claim 14 wherein said first inboard bearing member has a first annular bushing member supporting said first end of said shell and a second annular bushing member mounted on said shaft, wherein said second inboard bearing member has a first annular bushing member supporting said second end of said shell and a second annular bushing member mounted on said shaft, and wherein said first and second annular bushing members of said first and second inboard bearing members have complementary spherical engagement surfaces.

16. A roll as set forth in claim 12 wherein said outboard bearing members are spherical bearings.

17. A roll as set forth in claim 12 and further comprising first and second shell support members respectively supporting said first and second ends of said shell, and wherein said first and second inboard bearing members respectively support said first and second shell support members.

18. A roll as set forth in claim 17 wherein said first and second shell support members have respective inner surfaces, wherein said shaft has an outer surface, and wherein said roll further comprises a first seal assembly sealingly engaging said inner surface of said first shell support member and said outer surface of said shaft and a second seal assembly sealingly engaging said inner surface of said second shell support member and said outer surface of said shaft, said first seal assembly being axially located between said first inboard bearing member and said first outboard shoe assembly, said second seal assembly being axially located between said second inboard bearing member and said second outboard shoe assembly.

19. A roll as set forth in claim 18 and further comprising a first fluid and a second fluid lubricating said shell and said bearing pad, wherein said seal assemblies seal said first fluid from said second fluid.

20. A roll as set forth in claim 19 wherein said inner surfaces of said first and second shell support members are annular, wherein said outer surface of said shaft is cylindrical, and wherein said seal assemblies are radially extending barrier seals forming a liquid barrier and a heat shield between said first and second fluids.

21. A roll as set forth in claim 17 and further comprising first and second shell bearings supporting said shell relative to said first and second shell support members, respectively, and a drive mechanism to rotatably drive said shell.

* * * * *